(12) United States Patent
Bensberg et al.

(10) Patent No.: US 10,810,092 B2
(45) Date of Patent: Oct. 20, 2020

(54) CHECKPOINTS FOR DOCUMENT STORE

(71) Applicant: SAP SE, Walldorf (DE)

(72) Inventors: Christian Bensberg, Heidelberg (DE); Steffen Geissinger, Wiesloch (DE); Thorsten Glebe, Leimen (DE)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 15/959,744

(22) Filed: Apr. 23, 2018

(65) Prior Publication Data

US 2019/0324866 A1    Oct. 24, 2019

(51) Int. Cl.
| | |
|---|---|
| *G06F 16/00* | (2019.01) |
| *G06F 7/00* | (2006.01) |
| *G06F 11/14* | (2006.01) |
| *G06F 16/93* | (2019.01) |
| *G06F 16/11* | (2019.01) |
| *G06F 16/17* | (2019.01) |
| *G06F 16/176* | (2019.01) |
| *G06F 16/23* | (2019.01) |

(52) U.S. Cl.
CPC ........ *G06F 11/1469* (2013.01); *G06F 16/116* (2019.01); *G06F 16/128* (2019.01); *G06F 16/1734* (2019.01); *G06F 16/1774* (2019.01); *G06F 16/2379* (2019.01); *G06F 16/93* (2019.01); *G06F 2201/84* (2013.01)

(58) Field of Classification Search
CPC .............................. G06F 16/128; G06F 16/27
USPC .......................................................... 707/649
See application file for complete search history.

(56) References Cited

U.S. PATENT DOCUMENTS

| | | | |
|---|---|---|---|
| 10,360,195 B1 * | 7/2019 | McKelvie | ........... G06F 16/2282 |
| 2018/0253442 A1 * | 9/2018 | Aithal | ................. G06F 16/1774 |
| 2019/0236168 A1 * | 8/2019 | Vaswani | ............. G06F 16/2358 |

* cited by examiner

*Primary Examiner* — Usmaan Saeed
*Assistant Examiner* — Raquel Perez-Arroyo
(74) *Attorney, Agent, or Firm* — Buckley, Maschoff & Talwalkar LLC

(57) ABSTRACT

Provided are systems and methods for storing checkpoints of an in-memory storage device. In one example, the method may include detecting database transactions performed on a slice of an in-memory storage and storing a record of the database transactions in a log file, receiving a request to persist the slice of in-memory storage, the request comprising a timing indicator corresponding to a timing of database transactions, trimming the log file based on the timing indicator to remove a record of one or more database transactions from the log file that occurred prior to the timing indicator and to preserve a record of one or more database transactions that occurred after the timing indicator, and persisting, to disk, data from the slice of in-memory storage and the trimmed log file preserving the record of the one or more database transactions that occurred after the timing indicator.

15 Claims, 6 Drawing Sheets

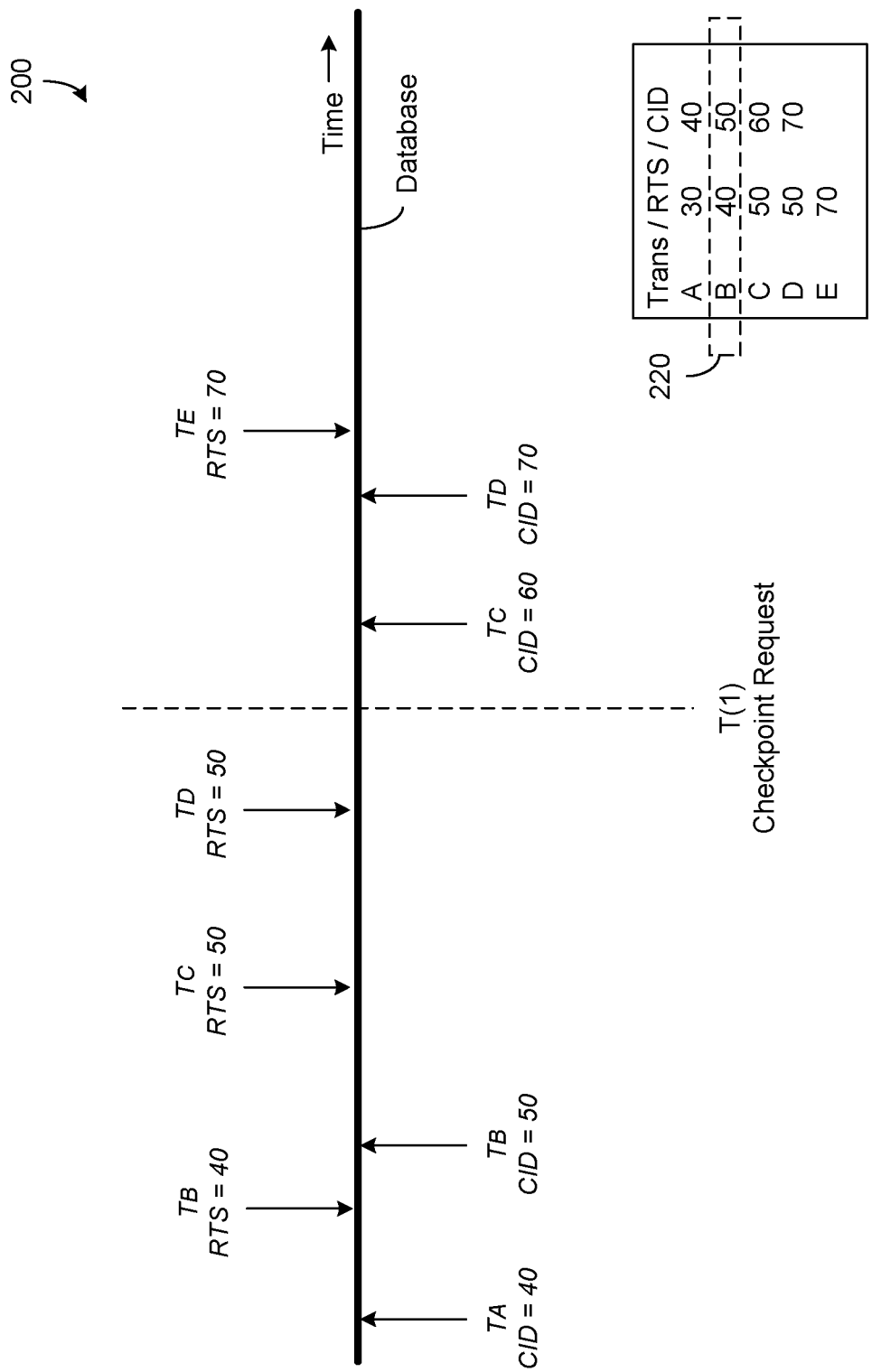

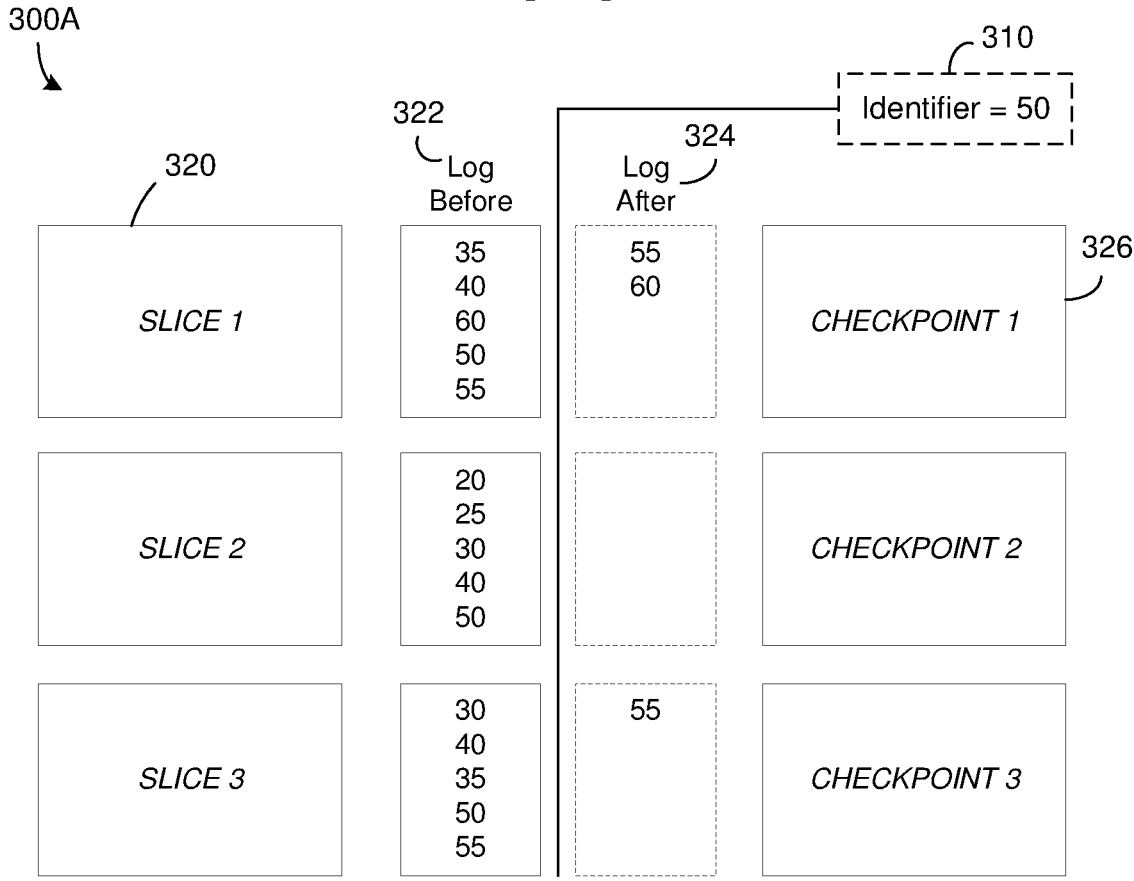
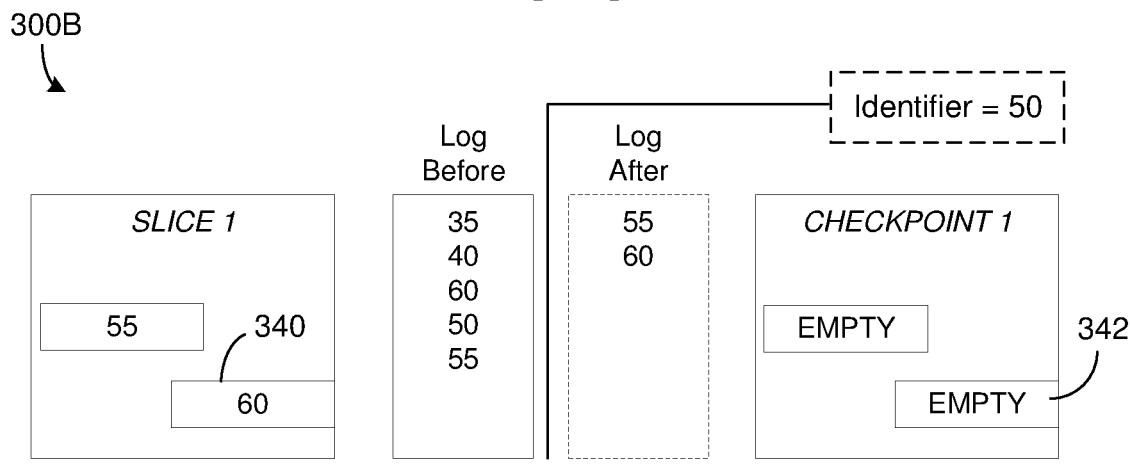

CHECKPOINTS FOR DOCUMENT STORE

BACKGROUND

A document database, also referred to as a document store, differs significantly from a traditional relational database (RDB). Relational databases generally store data in separate tables that are defined by a database administrator, in which data of a single data object may be spread across several tables. Meanwhile, document databases can store all information for a given object in a single database instance, and each stored object can differ from other stored objects. In other words, there may be no internal structure that maps directly onto the concept of a table, and the fields and relationships generally don't exist as predefined concepts. Instead, all of the data for an object is placed in a single document, and stored in the document database as a single entry. This makes mapping objects into the database a simple task, normally eliminating anything similar to an object-relational mapping. Accordingly, a document store is attractive for programming web applications, which are subject to continual change in place, and where speed of deployment is an important issue.

Backup and recovery procedures protect a database against data loss and reconstruct the data, should a loss occur such as a power failure, a restart, or the like. The reconstruction of data is achieved through media recovery, which refers to the various operations involved in restoring, rolling forward, and rolling back a backup of database files. However, traditional data recovery procedures for RDB systems require significant reconstruction processes, often re-performing each and every transaction on the database that happened prior to the loss occurring. As will be appreciated, re-performing each transaction can take significant time and resources and may not be efficient for a document store. Accordingly, what is needed is a more efficient way for backing up and recovering a document database.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a process of database transactions performed over time, in accordance with an example embodiment.

FIGS. 3A-3B are diagrams illustrating a process of generating and storing a checkpoint in accordance with example embodiments.

Figure 1:
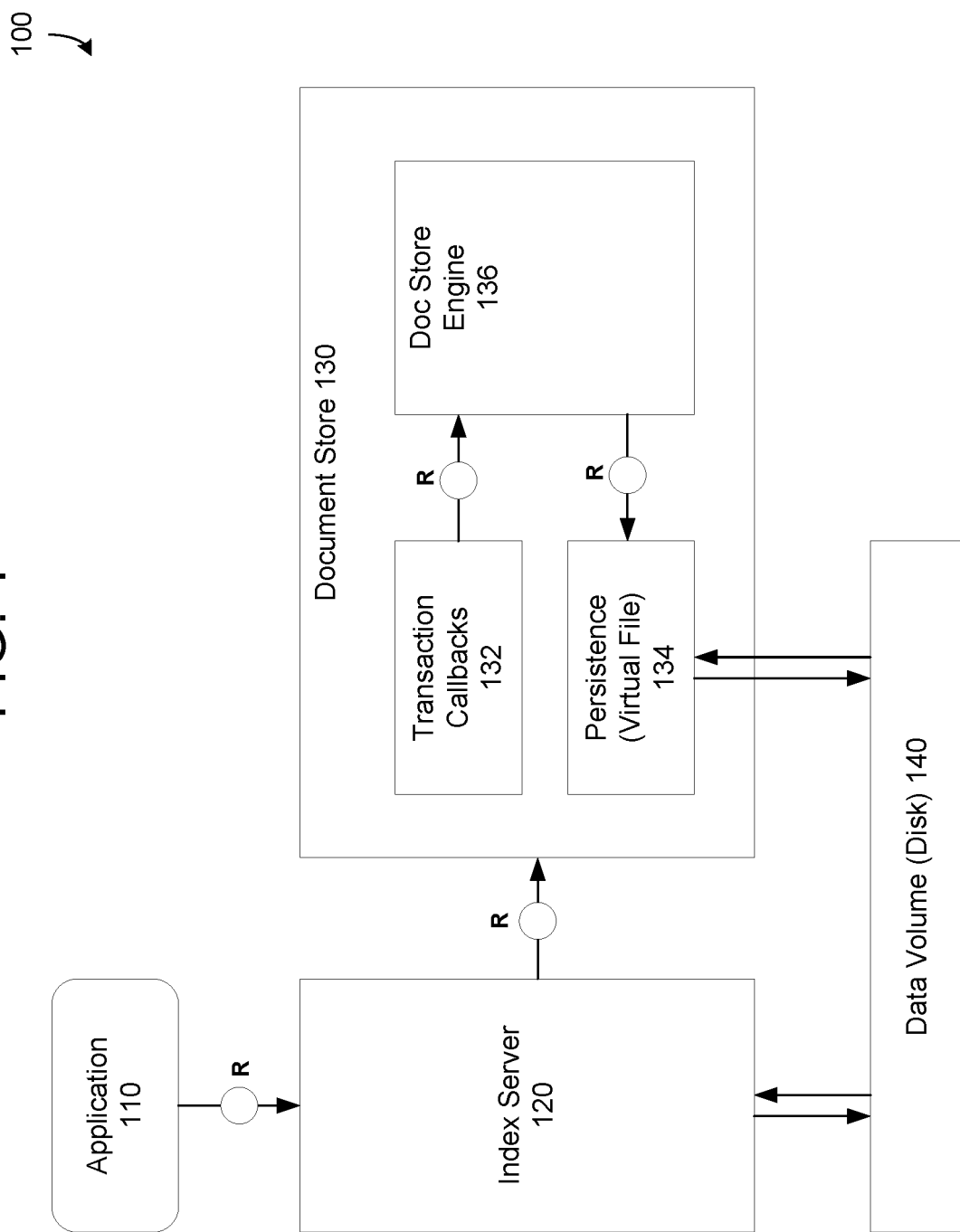
FIG. 1 is a diagram illustrating a database computing architecture including a document store in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed a system for storing a snapshot of data from main memory to disk in a database system such as a document store. The snapshot may be used for backup and recovery, loading and unloading, restarting the database, and the like. In particular, the example embodiments implement the use of checkpoints as a new way of backing up contents of a database in the event of a loss such as a power failure or a restart. Related database systems recover memory after loss by re-processing all transactions that occurred on the memory that have occurred over time. The database often relies on a transactional log that keeps a record of each and every transaction that occurs on the memory, as well as an order in which the transactions occurred. Therefore, instead of saving the actual data, the related database system only saves the transactional log which can be used to recover the database. However, re-creating the database by executing each transaction over again can take a significant amount of time and processing resources. To overcome these drawbacks, the example embodiments store a checkpoint of the state of a database which includes a copy of the data from a memory block as well as a trimmed log file which is further described herein in various examples.

A database may continuously receive and process database operations (also referred to as transactions) such as read, write, modify, delete, select, and the like. At any given time, a large database system can be simultaneously processing many different transactions. Therefore, simply taking a snapshot of the database at a particular point in time is not an effective way of backing up the database because transactions in the middle of being performed, as well as transactions out of order, unseen, and the like, can be missed. The example embodiments address this issue by storing a copy of content from a data block (such as a slice of memory) as a checkpoint along with a partial log file that keeps track of any transaction that is not fully visible to the system. The log can be trimmed significantly to reduce the amount of re-processing of transactions while also preserving only those transactions that are not fully visible thereby enabling the system to be restored in a more efficient (faster) process.

Within the document store, data may be organized in collections of main memory (also referred to as in-memory) and may have a document format such as a JavaScript Object Notation (JSON) document model format or an internal binary representation thereof. Each collection may be broken up into a plurality of partitions and each partition may be organized into a plurality of slices. The example embodiments provide a system for creating checkpoints on a slice-by-slice basis thereby reducing the level of complexity for a snapshot of the data (e.g., a consolidated representation of the data). Each slice may include its own log file that is kept and modified by the database as transactions occur on the respective slice. When a checkpoint request is received, the system may store a copy of the slice and a trimmed log file corresponding to the slice, to disk. By persisting the slice content as well as the trimmed log file, the slice can be restored or otherwise loaded significantly faster than related recovery processes because only the log transactions in the trimmed log need to be performed rather than all transactions in the log before the unload or crash occurred. When a checkpoint exists, the backup size of the data is smaller and recovery is faster. Furthermore, the burden to replay the log during any type of load of a collection, not just backup and recovery, is significantly improved as a result of the trimmed log file.

FIG. 1 illustrates a database computing architecture 100 in accordance with an example embodiment. Referring to FIG. 1, the architecture 100 includes an application 110 that interacts with an index server 120 for processing client/application requests. The index server 120 manages a document store 130 which may be an in-memory data structure such as dynamic random access memory (DRAM) or the like storing client data. The index server 120 and the document store 130 may both store data to disk 140. For example, the document store 130 may store checkpoints to disk 140, in response to the system requesting a checkpoint operation. Also, the document store 130 may be recovered based on checkpoint data stored in disk 140 in the event of a power loss or other failure.

The database computing architecture 100 may be incorporated within a database system such as an in-memory, column-oriented, relational database management system that functions as a database server to store and retrieve data as requested by software applications. The database system may combine both online analytical processing (OLAP) and online transaction processing (OLTP) operations into a single system. The database system may store data in main memory (e.g., document store 130) rather than on disk 140 which provides for faster data access, and by extension, faster querying and processing. The document store 130 may be an additional data store besides a column store and a row store (not shown). Here, the document store 130 may be an independent store that can interact with either of the column store and the row store for data storage.

In the example of FIG. 1, the index server 120 may perform session management, authorization, transaction management and command processing. Although shown as separate components in the example of FIG. 1, in some cases, the index server 120 may include the document store 130 as the engines for processing the data. The client application 110 may submit structured query language (SQL) and multidimensional expression (MDX) statements to the index server 120 in the context of authenticated sessions and transactions which may be executed on data included in the document store 130 as well as other data stores. The index server 100 also manages persistence between cached memory images of database objects, log files and permanent storage files.

To work on the database, a client may design the application 110 using a design of their choice. A connection and session management process may be performed by the index server for creating and managing database clients and the corresponding applications such as client application 110. Once a session is established, client application 110 can communicate with the database using SQL statements, for example. For each session a set of parameters may be maintained such as auto-commit, current transaction isolation level, etc. Also, users may be authenticated either by the database itself (login with username and password) or authentication can be delegated to an external authentication providers such as an LDAP directory.

Client requests may be analyzed and executed by the index server 120. For example, incoming SQL requests may be routed to an SQL processor of the index server. Data manipulation statements may be executed by the SQL processor. As another example, other types of requests may be delegated to other components. For example, data definition statements may be dispatched to a metadata manager, transaction control statements may be forwarded to a transaction manager, planning commands may be routed to a planning engine and procedure calls may be forwarded to a stored procedure processor. An SQL statement may be processed in the context of a transaction. New sessions may be implicitly assigned to a new transaction. The transaction manager may coordinate database transactions, controls transactional isolation and keeps track of running and closed transactions. When a transaction is committed or rolled back, the transaction manager informs the involved engines (e.g., document store 130, column store, row store, etc.) about this event so they can execute necessary actions. The transaction manager also cooperates with a persistence layer of the index server to store data to disk 140 to achieve atomic and durable transactions.

Metadata can be accessed via the metadata manager component of the index server 120. In the database, metadata may include a variety of objects, such as definitions of relational tables, columns, views, indexes and procedures. Metadata of all these types may be stored in one common database catalog for all stores. The database catalog may be stored as tables in row store. The features of the database such as transaction support and multi-version concurrency control, are also used for metadata management.

The index server 120 may support different data stores (i.e., different engines) such as a document store 130, a column store, and a row store, and the like. As described herein, a store is a sub-system of the database which includes in-memory storage, as well as the components that manages that storage. For example, a row store may be a database row-based in-memory relational data engine. Meanwhile, a column store may store tables column-wise. The document store 130 (also referred to as a JSON document store) may store documents in the form of collections. The need to store unstructured data such as social media, multimedia, etc. has grown rapidly. SQL meanwhile requires structure to be specified in advance which means that any changes to the information schema require time-consuming alter statements to run on a table. The document store 130 overcomes this issue by loosening the restrictions on database schema and allows data to be grouped together more logically and naturally. In the document model, each record and its associated data is through of as a "document."

In the document store 130, all data related to a database object is encapsulated together. As a result, documents are independent units which make performance better and make it easier to distribute data across multiple servers while preserving locality. Furthermore, application logic is easier to write because no translation is needed between objects in an application and SQL queries. Rather, the object model can be turned directly into a document. Also, unstructured data can be stored easily since a document may contain whatever keys and values the application logic requires. The callback transaction layer 132 may receive requests from the index server 120 and process those requests on content stored in the document store engine 136.

The document store 130 may also include a persistence layer 134 which provides data persistency to disk 140. Like a traditional database, page management and logging may be performed by the persistence layer 134. According to various embodiments, the changes made to the in-memory database pages may be persisted through checkpoints. Checkpoints may be written to data volumes on the persistent storage 140 for which the storage medium is hard drives. All transactions committed in the database are stored/saved/referenced by a logger 134 of the persistence layer 134 in a log entry written to the disk 140 on the persistent storage. To get high I/O performance and low latency, log volumes may use flash technology storage. Furthermore, the persistence layer 134 is responsible for durability and atomicity of transactions. This layer ensures that the database is restored to the most recent committed state after a restart or other loss and that transactions are either completely executed or completely undone. To achieve this in an efficient way, the persistence layer 134 uses a combination of checkpoints and trimmed logs.

FIG. 2 illustrates a process 200 of database transactions performed over time, in accordance with an example embodiment. The process of FIG. 2 may be used to establish a checkpoint identifier which is also referred to herein as a timing identifier. Referring to FIG. 2, database transactions occur over time. Simply as a matter of convenience, each transaction in this example includes a read operation and a write operation with reads being performed on top of the timeline and commits being performed on the bottom of the timeline. Each time an initial read operation occurs for a transaction, the transaction is assigned a timestamp which may be referred to as a read timestamp. Here, the timestamp may not be a clock time received from a system clock, but may instead be an incremental counter value received from a transaction manager or other program executing on the database. In addition to the read timestamp, when a transaction is subsequently committed to the database, the transaction is assigned a commit identifier. The database may be structured such that a read operation of a next transaction may be assigned a read timestamp equal to a commit ID of a previous transaction that was most recently committed to the database.

Referring to the example of FIG. 2, the first transaction on the timeline is transaction A which is committed to the database and assigned a commit ID of 40. The next transaction to occur is transaction B which reads from the database and is assigned a read timestamp of 40 which corresponds to the commit ID of the most recently committed transaction (transaction A). This means that transaction B may read data written by transaction A, and all transactions that have been committed before transaction A. The next interaction with the database is the commit of transaction B to the database which is assigned a commit ID of 50. In this example, the commit ID may be generated by an incremental counter managed by a transaction manger, a component within the document store, and/or the like. The increments may be anything (numbers, letters, etc.) which can chronologically indicate an order of timing of operations.

According to various embodiments, when a transaction performs a read operation from the database, the only other transactions that are visible to the read operation are those transactions that have already been committed prior to the read occurring. The read snapshot that defines until which commit may be read is either stable for a transaction (transaction isolation), or stable within the boundaries of a statement (statement isolation). This is a setting per transaction or session that has to be defined prior to any data access. In the example of FIG. 2, transaction isolation shall be used and transaction C performs a read operation and is assigned a read timestamp of 50 corresponding to the most recent commit ID of transaction B. Meanwhile, transaction D represented by reference numeral 222 in the table performs a next read operation by reading from the database and is also assigned the same read timestamp of 50 because that is still the most recent commit ID. Here, the result of transaction C is not visible to transaction D because transaction C has not committed to the database yet but instead has only performed a read. Accordingly, transaction D is not able to see transaction C. Because transaction C is not visible to transaction D, the most recent transaction that is visible to all transactions in the database is transaction B which has a commit ID of 50.

In this example, the database may receive a request to perform a checkpoint for contents of the database at a time (T1) represented by the vertical dashed line shown in FIG. 2. The example of FIG. 2 assumes that only the transactions shown in FIG. 2 are all transactions in the database. In this example, the database may select a commit ID of a most recent transaction that is visible to all subsequent transactions as a checkpoint identifier (also referred to herein as a minimum read timestamp or a timing identifier). The selected timing identifier is therefore visible to every transaction in the system that comes after it. Every value that is below the timing identifier is visible to every transaction currently pending and that will come in the future. In this example, the most recent transaction committed and visible to all subsequent transactions is transaction B having a commit ID of 50 and represented by reference numeral 220 when the checkpoint is performed at the time T1. Therefore, the database may select a timing identifier of 50 which may be used to perform the checkpoint process and trim the log file as described herein.

A transaction manager may maintain an identification of a current commit ID and a current read timestamp. Previous transactions only become visible to a current transaction being read if the previous transaction was committed before the new transaction started (assuming transaction isolation). Accordingly, if a transaction starts, writes of other transactions are not visible if these have not yet been committed. The read timestamp assigned to each transaction during the read operation means that every object is only visible to this transaction if it is assigned a commit ID that is less than or equal to a number associated with the current transaction. Accordingly, the system is aware of what is visible to a transaction based on the commit ID. The commit IDs and the read timestamps are what is used to figure out what has been written by which transaction to provide an understanding of what is visible to a new transaction. Everything with a commit ID that is equal to or less than a current read timestamp is visible to a currently read transaction, in the example of FIG. 2.

FIGS. 3A-3B illustrate a process of generating and storing a checkpoint in accordance with example embodiments. In this example, FIG. 3A illustrates a process 300A of a database performing a checkpoint operation on a plurality of memory slices, and FIG. 3B illustrates a process 300B of data being stored based on a checkpoint operation of a slice included in the process 300A of FIG. 3A. A checkpoint operation may be performed on a slice-by-slice basis. In this example, what is currently residing in a slice of memory (same block) is copied to disk as a checkpoint and the log file is cleaned up or otherwise trimmed. Accordingly, when the system needs to reload a slice, a checkpoint copy on disk may be loaded into the in-memory in one shot making the reload process significantly more efficient than scanning through the log file and re-applying old operations (insert, update, delete, etc.) the data. Previous operations (insert, update, delete, etc.) from the trimmed log must be replayed/re-applied. But given that it has been trimmed, its volume is lower and therefore the overall load time shorter than without checkpoints.

Referring to FIG. 3A, a checkpoint operation is performed on three slices of memory. In this example, a slice of memory 320 has a log before 322 representing a record of all transactions occurring on the slice of memory 320. This log is represented using timestamps of the most recent transactions. Here, the system issues a checkpoint request and a timing identifier of 50 which is the minimum read timestamp in the system at the point in time of the checkpoint. Accordingly, all transactions with a read timestamp less than or equal to the timing identifier may be removed from the log because those transactions are visible to every transaction currently pending. In this case, the log before 322 the checkpoint is trimmed to the log after 324 based on the timing identifier 310. In addition, a copy of the data included in the slice 320 may be stored on disk as a checkpoint 326. Here, the data may be copied from the slice and stored to disk with or without a compression process. Meanwhile, the log after 324 may also be stored with the checkpoint 326 (or as part of the checkpoint) and can be used to reconstruct only those transactions which are not visible to all transactions when the checkpoint request is received. Therefore, the accurate memory contents can be restored without having to execute the entire transaction log.

In some embodiments the minimum read timestamp is being used to define the snapshot of what is included in the checkpoint. In these embodiments the minimum read timestamp may define data that is "fixed" in the sense that all transactions may see it, all post-processing (like garbage collection) has been executed on it and all data may be accessed without locking etc. In alternative embodiments, checkpoints are being created using higher timestamps, for example equal to the highest commit ID in the system. Accessing the data may require further steps, like acquiring locks to prevent parallel processing of the data, checks whether the data has been deleted (and is therefore subject to garbage collection) or the like.

FIG. 3B illustrates a process 300B of storing contents of a slice in a checkpoint on disk. In this example, the slice includes data from transactions in the log after file corresponding to timestamps 55 and 60. Should a restart occur, these transactions are going to be re-executed from the log after file. Therefore, this data may be removed from the slice representation prior to storing the checkpoint onto disk. In other words, results of database operations generated by the transactions at timestamps 55 and 60 may be undone or otherwise removed from the slice and not persisted at all, for example due to a transaction rollback. Accordingly, the transactions will not be performed redundantly when the log after is read and used to reconstruct the memory slice. Here, a memory block 340 in the slice of memory is shown as an empty block 342 (or a gap) in the checkpoint on disk. It may or may not be filled when replaying the log after, based on whether the corresponding transactions got committed.

Figure 4:
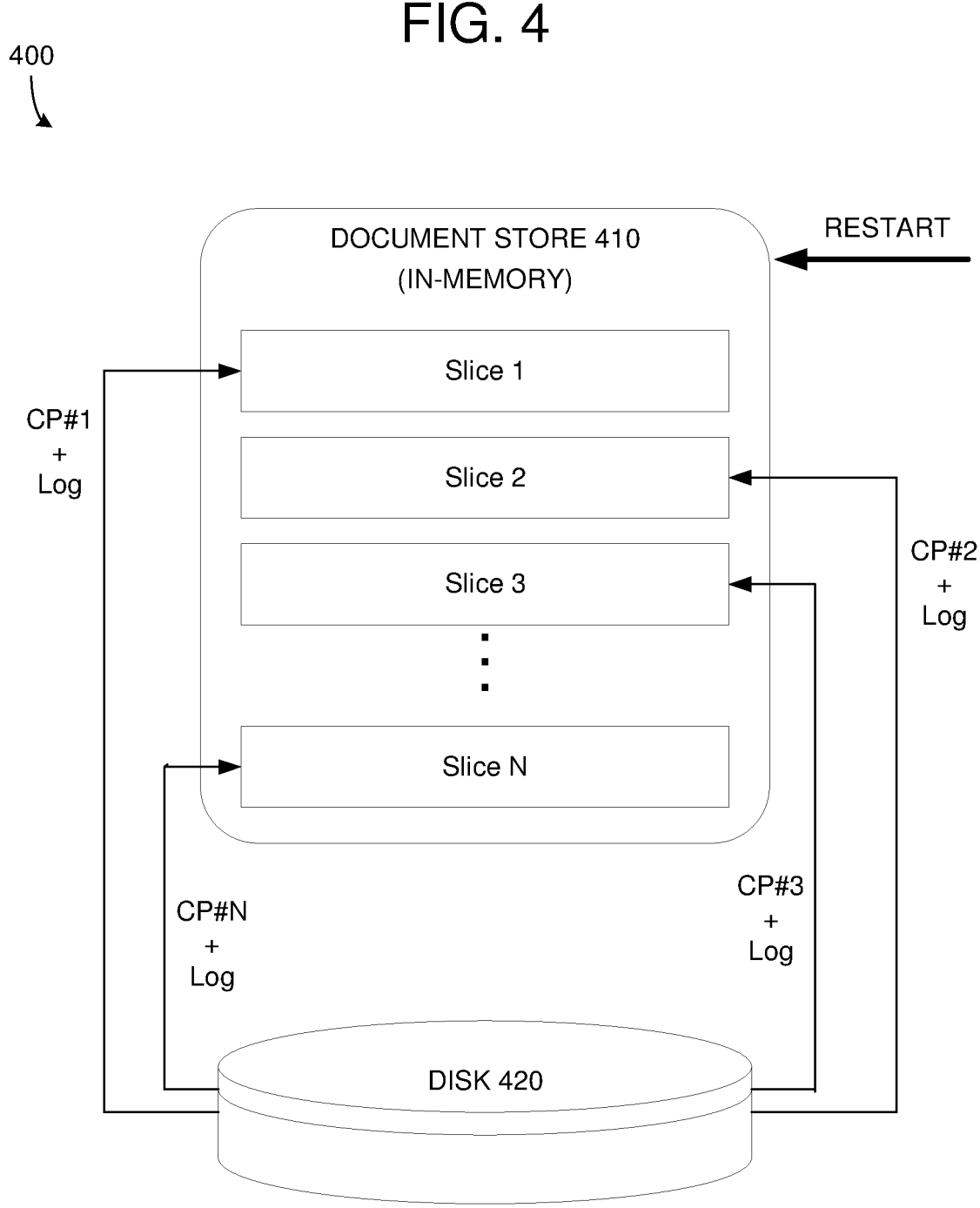
FIG. 4 is a diagram illustrating a reload process based on a previously stored checkpoint, in accordance example embodiments.

According to various embodiments, a slice of memory can be reconstructed based on the checkpoint data and the "log after" also referred to as a trimmed log file. Referring to FIG. 4B, a plurality of slices of memory included in a document store 430 may be restored after a restart has been performed or slices got unloaded before. Here, each checkpoint has been previously stored to disk 420. If we have a crash or some other loss causing a restart, everything in the main memory of the document store 430 can be reconstructed from the checkpoints and the log after files on a slice-by-slice basis. Administrators may actively unload slices or partitions. Also, the database may actively unload slices if memory is scarce, for example using a last-recently-used algorithm. The checkpoints and the log after are always written to disk 420. Accordingly, each slice can be restored from disk 420 using respective checkpoints/trimmed log files.

As described herein, checkpoints correspond to a dump of memory to disk, while removing all the entries from the log file that have been written to disk. As a result, the log file only preserves the transactions having a read timestamp after the timing identifier because results of these transactions are not visible to all transactions at the time of the checkpoint and therefore are not stored as part of the checkpoint. One of the benefits of trimming the log file is that the system does not have to read the log anymore because you can use the checkpoint to reconstruct a slice of memory. The log before and the log after plus the checkpoint contents must result in the same representation in memory. The goal of the checkpoint is to clear the log as much as possible. The log and the checkpoint are written to disk. These are the two things to reconstruct the document store slice. To reload, just load the checkpoint and then apply the operations in the log after without having to reapply all transactions like in a save point.

According to various aspects, a transaction may not be visible to all transactions because it was written and committed by a transaction at a later time, or more important, it was written and the transaction was subsequently aborted. In this later case, you do not want to checkpoint the data. You only write checkpoint data to disk when you are 100% it is visible to all the system. A garbage collection process may subsequently clean it up, but the system does not want to persist it somewhere before the garbage collector can get there.

Furthermore, when a checkpoint is being written to disk, the system does not want to block transactions from reading data from the in-memory document store, but only prevent writing to the in-memory document store. Accordingly, the database may place a lock on the document store which prevents data from being written but which enables data to be read from the document store. In other words, the lock operation allows concurrent transactions to read data while the checkpoint is being written. In some embodiments, the checkpoint is being performed on a snapshot that is equal or less than the minimum read timestamp. This allows reading the data for the checkpoint without having locks on the slice data itself. This way, even write operations are possible on the slice while the data for the checkpoint is collection. It is required though to prevent the slice from unloading and more garbage collection or re-compaction to be executed.

The trimming of the log file may be performed in various ways. For example, the log file may be split up filtered to remove the transactions visible to all transactions while preserving only those transactions that are not visible to all. However, the system does not want to delete the log file because there is likely parallel transactions reading/writing or otherwise working on the same slice being check-pointed. Furthermore, the system cannot simply rewrite the entire file because it would lose the commit information (timing identifier) used when the original transactions committed. In other words, the system would use the minimum read timestamp that is used to generate the checkpoint. Accordingly, in some embodiments, the timing identifier (minimum read timestamp) may be inserted or otherwise included in metadata of the checkpoint data stored on disk. The log file and the checkpoint file may be a virtual file that can be modified with metadata such as in a header or the like. This information is not part of the content that gets written to the file, but it is attached to the file via metadata and attach it somewhere to the virtual file. The system now has the timing identifier of the checkpoint included in metadata and can use it for the checkpoint/restore.

The before log and the after log plus the checkpoint are two different representations of the same data. From a logical or semantic point of view, it does not matter whether the one or the other are being used to load a slice back to memory. When the checkpoint is written to the persistence, it is a modification to a file. In its default behavior, the database would write redo information in order to be able to recreate the checkpoint file in case of crashes before a savepoint is written. In such a case, the database would be able to re-create the checkpoint file and read it. But writing redo log for the checkpoint file is not required, given that the original before log contains the same data. Therefore, it is allowed to disable the creation of the redo log when writing the checkpoint file. Assuming the database starts after a crash, it would not see the checkpoint file, but the before log. It would replay the before log. Either the administrator would then re-trigger the creation of a checkpoint, or the system would do so automatically as it discovers log entries that could be checkpointed.

Figure 5:
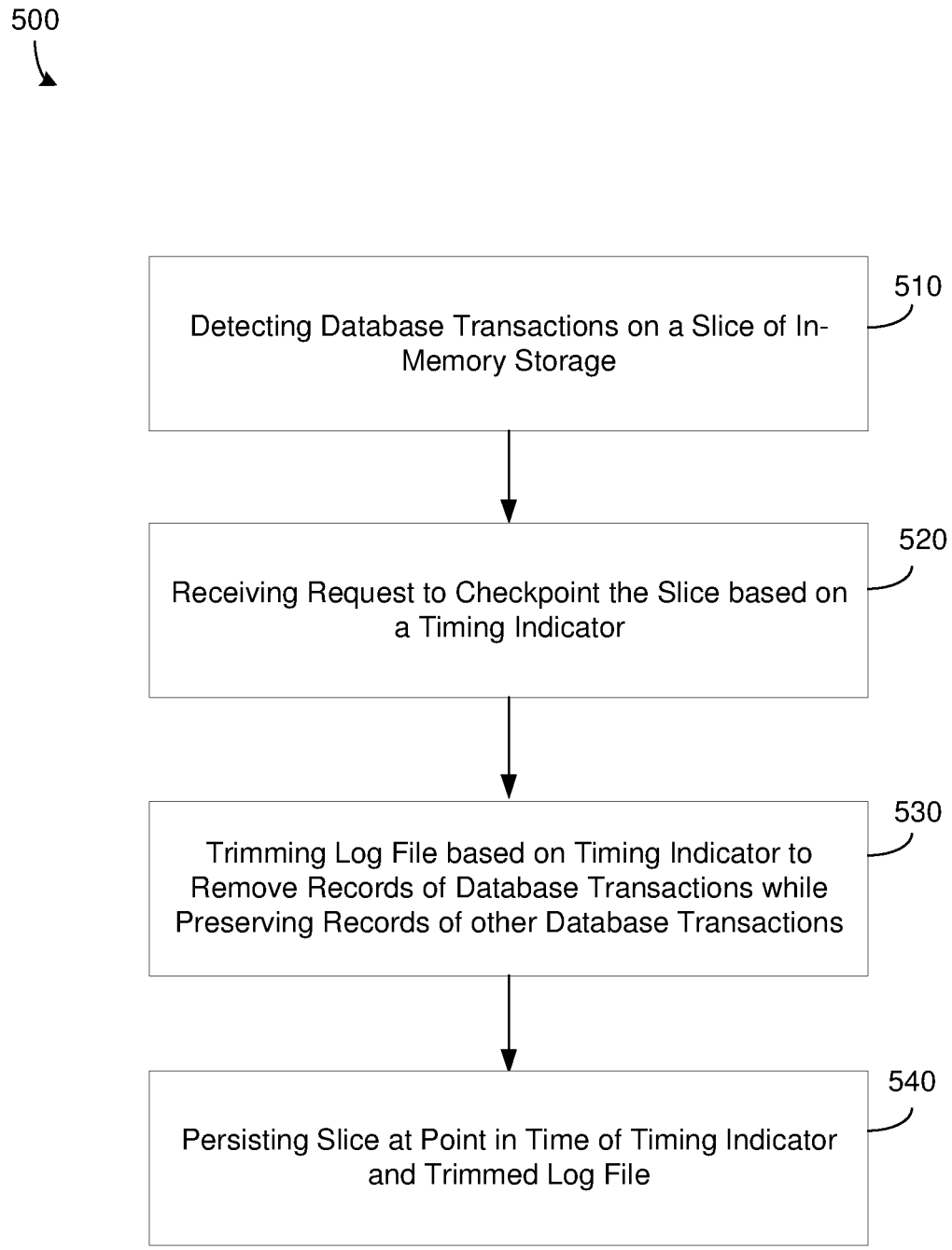
FIG. 5 is a diagram illustrating a method for generating and storing a database checkpoint in accordance with an example embodiment.

FIG. 5 illustrates a method 500 for generating and storing a database checkpoint in accordance with an example embodiment. As an example, the method 500 may be performed by a database node included within a distributed database system. As another example, the method 500 may be performed by a computing device such as a server, a cloud platform, a computer, a user device, and the like. In some examples, the method 500 may be performed by a plurality of devices in combination. Referring to FIG. 5, in 510, the method may include detecting database transactions performed on a slice of memory (or other type of memory block) and storing a record of the database transactions in a log file.

For example, the database may be a document store, or other type of data store, divided into a plurality of collections each having a plurality of partitions. The document store may store data in document model format. Partitions may store data blocks in tabular format such as rows, columns, etc. Furthermore, each partition may have a plurality of slices which are configured to store respective data. The partitions/slices may be implemented in a main memory area rather than a hard disk. In this way, data stores in slices may be accessed faster than data stored on disk, but may have limits in the amount of data that can be stored. That database may maintain a log file for each slice. For example, the log file may include a record of each transaction performed on data stored in the slice (e.g., update, read, select, write, modify, etc.), and an order in which the transactions are applied to the slice.

In 520, the method may include receiving a request to persist the slice of in-memory storage. The request may be issued by the database in response to a condition occurring. For example, the request may be triggered by one or more factors being detected such as a predetermined network capacity, a predetermined power level, a predetermined throughput/efficiency, an amount of transactions processed being at a predetermined threshold, and the like. As another example, the checkpoint may be performed periodically, randomly, or even in response to a user request. According to various aspects, the request may include a timing indicator corresponding to a timing of database transactions. For example, the timing indicator may be a number such as a timestamp, an incremental counter value, etc., which can be compared to timestamps and commit IDs of database transactions.

In 530, the method may include trimming the log file based on the timing indicator. In this example, the log file may be trimmed based on all transactions that are currently visible to the whole system and that can be successfully stored as a checkpoint on disk. In some example, the log file may be trimmed by removing records of one or more database transactions from the log file that occurred prior to the timing indicator. As another example, database transactions that are not visible to the entire system may be preserved in the log file and may be persisted along with the checkpoint to disk. For example, the system may preserve a record of one or more database transactions that occurred after the timing indicator. In 540, the method may include persisting, to disk, data present in the slice based on a point in time of the timing indicator and the trimmed log file preserving the record of the one or more database transactions that occurred after the timing indicator.

In some embodiments, when generating the checkpoint and storing the checkpoint to disk, the method may include removing a database result of the one or more database transactions that occurred after the timing indicator from the slice, prior to persisting the slice to disk. In other words, the method may include removing any database results from a slice which are a result of database transactions that are preserved in the trimmed log file. Accordingly, these transactions may be performed again based on the checkpoint, should the checkpoint be used to restore the memory slice.

In some embodiments, the timing indicator may include an incremental counter that represents a time at which a most recently committed database transaction was performed on the slice and that is visible to all database transactions. Each time a transaction result is committed or otherwise applied to the slice, the counter may be incremented. Furthermore, each time a new transaction reads data from the slice, it may be assigned a read timestamp that corresponds to the most recent counter value of the counter for committing transactions. In this example, the trimming performed in 530 may include removing a record of all database transactions from the log file that have a read timestamp that is less than or equal to the counter and preserving a record of all database transactions in the log file having a timestamp greater than the counter.

Prior to, during, or after persisting the slice as a checkpoint on disk, the method may further include inserting an identification of the timing indicator within metadata of the trimmed log file. For example, the timing indicator may be inserted or otherwise added within a header or another field or area of the log file that does not interfere with the ability of the log. In some embodiments, when the checkpointing is being performed, the method may further include locking the slice from write access such that database transactions are prevented from writing to the slice while the trimming of the log file and the persisting of the slice are performed. As another example, the method may further include receiving a request to reload the persisted slice from disk, and in response, loading the persisted slice and the trimmed log file, and executing the database transactions included in the trimmed log file to reconstruct a current state of the slice in the in-memory.

Figure 6:
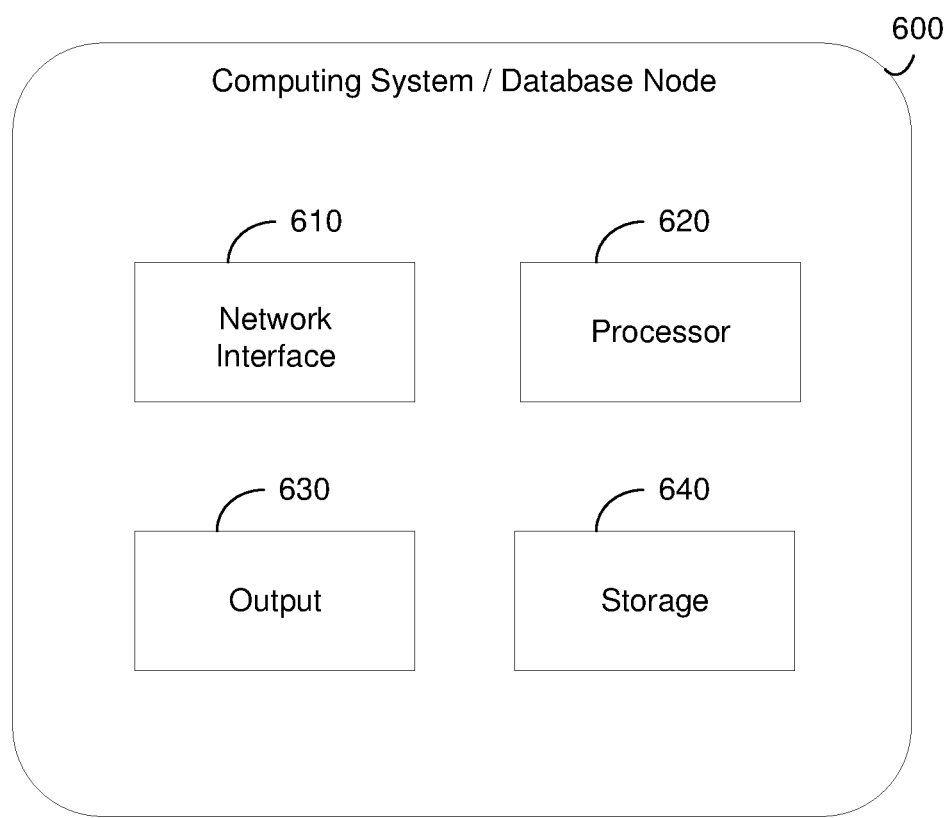
FIG. 6 is a diagram illustrating a computing system in accordance with an example embodiment.

FIG. 6 illustrates a computing system 600 that can generate and store checkpoints, in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory. Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices. The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 500 shown in FIG. 5.

According to various embodiments, the storage 640 may include an in-memory storage that stores tabular data in partitions. Each partition may be implemented via a plurality of memory slices. In some embodiments, the in-memory data storage may be a document store which stores database transactions in document model format. In some embodiments, the processor 620 may detect database transactions (e.g., transactions, etc.) performed on a slice of the in-memory storage and store a record of the database transactions in a log file. The log file may continue to be updated each time a new transaction occurs. According to various aspects, the processor 620 may receive a request to persist the slice of in-memory storage. In this example, the request may be a checkpoint request in which the database requests that memory to store a checkpoint of the contents of the slice of memory. The request may include or otherwise identify a timing indicator corresponding to a timing of database transactions. Here, the processor 620 may trim the log file based on the timing indicator to remove a record of any database transactions from the log file that occurred prior to the timing indicator and to preserve a record of any database transactions that occurred after the timing indicator. Furthermore, the processor 620 may persist, to disk, data content in the slice based on a point in time of the timing indicator and the trimmed log file preserving the record of the one or more database transactions that occurred after the timing indicator.

In some embodiments, the processor 620 may remove a database result of the one or more database transactions that occurred after the timing indicator from the slice, prior to the slice being persisted to disk. Here, the resulting slice may have a gap or an empty storage area where the database result was stored. The gap may be persisted along with the rest of the content included in the slice. In some embodiments, the timing indicator may include a counter that represents a time or is otherwise associated with a chronological order at which a most recently committed database transaction was performed on the slice of memory and that is visible to all database transactions. In this example, the processor 620 may remove a record of all database transactions from the log file that have a timestamp less than or equal to the counter and preserve a record of all database transactions in the log file having a timestamp greater than the counter.

In some embodiments, the processor 620 may insert an identification of the timing indicator within metadata of the trimmed log file prior to the trimmed log file being persisted to disk. In some embodiments, the processor 620 may receive a request to reload the persisted slice from disk, and in response, load the persisted slice and the trimmed log file, and execute the database transactions stored in the trimmed log file to reconstruct a current state of the slice in the in-memory. In some embodiments, the processor 620 may lock the slice from write access such that database transactions are prevented from writing to the slice while the trimming of the log file and the persisting of the slice are performed.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    an in-memory storage; and
    a processor configured to
        detect database transactions performed on a slice of the in-memory storage and store a record of the database transactions in a log file,
        receive a request to persist the slice of in-memory storage, the request comprising an incremental counter value that comprises a value that represents a commit identification value of a most recently committed database transaction performed on the slice and that is visible to all database transactions,
        trim the log file based on the incremental counter value by removing a record of one or more database transactions from the log file that have a commit identification value that is less than the incremental counter value and preserving a record of one or more database transactions that have a commit identification value that is greater than the incremental counter value, wherein the processor is configured to preserve a record of all database transactions from the log file that have a read identification value that is less than or equal to the incremental counter value and a commit identification value that is greater than the incremental counter value, and
        persist, to disk, data present in the slice and the trimmed log file preserving the record of the one or more database transactions that have the commit identification value that is greater than the incremental counter value.

2. The computing system of claim 1, wherein the in-memory storage comprise a document store storing database records in a document model format.

3. The computing system of claim 1, wherein the processor is further configured to remove a database result of the one or more database transactions that are trimmed from the log file from the slice, prior to the slice being persisted to disk.

4. The computing system of claim 1, wherein the processor is further configured to insert an identification of the incremental counter value within metadata of the trimmed log file prior to the trimmed log file being persisted to disk.

5. The computing system of claim 1, wherein the processor is further configured to receive a request to reload the persisted slice from disk, and in response, load the persisted slice and the trimmed log file, and execute the database transactions stored in the trimmed log file to reconstruct a current state of the slice in the in-memory.

6. The computing system of claim 1, wherein the processor is further configured to lock the slice from write access such that database transactions are prevented from writing to the slice while the trimming of the log file and the persisting of the slice are performed.

7. A method comprising:
    detecting database transactions performed on a slice of an in-memory storage and storing a record of the database transactions in a log file;
    receiving a request to persist the slice of in-memory storage, the request comprising an incremental counter value that comprises a value that represents a commit identification value of a most recently committed database transaction performed on the slice and that is visible to all database transactions;
    trimming the log file based on the incremental counter value by removing a record of one or more database transactions from the log file that have a commit identification value that is less than the incremental counter value and preserving a record of one or more database transactions that have a commit identification value that is greater than the incremental counter value, wherein the trimming comprises preserving a record of all database transactions from the log file that have a read identification value that is less than or equal to the incremental counter value and a commit identification value that is greater than the incremental counter value; and
    persisting, to disk, data present in the slice and the trimmed log file preserving the record of the one or more database transactions that have the commit identification value that is greater than the incremental counter value.

8. The method of claim 7, wherein the in-memory storage comprise a document store storing database records in a document model format.

9. The method of claim 7, further comprising removing a database result of the one or more database transactions that are trimmed from the log file from the slice, prior to persisting the slice to disk.

10. The method of claim 7, further comprising inserting an identification of the incremental counter value within metadata of the trimmed log file prior to persisting the trimmed log file to disk.

11. The method of claim 7, further comprising receiving a request to reload the persisted slice from disk, and in response, loading the persisted slice and the trimmed log file, and executing the database transactions included in the trimmed log file to reconstruct a current state of the slice in the in-memory.

12. The method of claim 7, further comprising locking the slice from write access such that database transactions are prevented from writing to the slice while the trimming of the log file and the persisting of the slice are performed.

13. A non-transitory computer-readable storage medium storing program instructions that when executed cause a processor to perform a method comprising:
    detecting database transactions performed on a slice of an in-memory storage and storing a record of the database transactions in a log file;
    receiving a request to persist the slice of in-memory storage, the request comprising an incremental counter value that comprises a value that represents a commit identification value of a most recently committed database transaction performed on the slice and that is visible to all database transactions;

trimming the log file based on the incremental counter value by removing a record of one or more database transactions from the log file that have a commit identification value that is less than the incremental counter value and preserving a record of one or more database transactions that have a commit identification value that is greater than the incremental counter value, wherein the trimming comprises preserving a record of all database transactions from the log file that have a read identification value that is less than or equal to the incremental counter value and a commit identification value that is greater than the incremental counter value; and persisting, to disk, data present in the slice and the trimmed log file preserving the record of the one or more database transactions that have the commit identification value that is greater than the incremental counter value.

14. The non-transitory computer readable medium of claim 13, wherein the in-memory storage comprise a document store storing database records in a document model format.

15. The non-transitory computer readable medium of claim 13, wherein the method further comprises removing a database result of the one or more database transactions that occurred are trimmed from the log file from the slice, prior to persisting the slice to disk.

* * * * *